(12) United States Patent
Surianarayanan et al.

(10) Patent No.: US 7,194,349 B2
(45) Date of Patent: Mar. 20, 2007

(54) CLOSED-LOOP, VALVE-BASED TRANSMISSION CONTROL ALGORITHUM

(75) Inventors: Ananthakrishnan Surianarayanan, Lansdale, PA (US); David R. Sosnowski, Lake Orion, MI (US); Mark L. Dell' Eva, Grand Blanc, MI (US); Peter M. Jacobsen, Oakland Township, MI (US); Eric O. Barrows, Romeo, MI (US)

(73) Assignee: Eaton Corporation, Cleveland, OH (US)

( * ) Notice: Subject to any disclaimer, the term of this patent is extended or adjusted under 35 U.S.C. 154(b) by 84 days.

(21) Appl. No.: 10/874,133

(22) Filed: Jun. 22, 2004

(65) Prior Publication Data
US 2005/0283297 A1    Dec. 22, 2005

(51) Int. Cl.
*G06F 7/00* (2006.01)
*B60W 10/02* (2006.01)

(52) U.S. Cl. .............................. 701/60; 701/58; 477/70

(58) Field of Classification Search ................ None
See application file for complete search history.

(56) References Cited

U.S. PATENT DOCUMENTS

| | | | | |
|---|---|---|---|---|
| 3,752,011 | A * | 8/1973 | Casey et al. ................... | 475/63 |
| 4,611,285 | A | 9/1986 | Weisman, II | |
| 4,776,233 | A | 10/1988 | Kita et al. | |
| 4,781,080 | A | 11/1988 | Iwatsuki | |
| 4,791,568 | A | 12/1988 | Hiramatsu et al. | |
| 4,956,776 | A | 9/1990 | Carre | |
| 5,062,050 | A | 10/1991 | Petzold et al. | |
| 5,074,167 | A * | 12/1991 | Yoshimura et al. .......... | 477/161 |
| 5,318,159 | A * | 6/1994 | Kashiwabara ................ | 477/169 |
| 5,400,678 | A * | 3/1995 | Jain et al. ..................... | 477/115 |
| 5,899,829 | A | 5/1999 | Salecker et al. | |
| 6,022,293 | A * | 2/2000 | Dourra et al. ............... | 477/158 |
| 6,243,637 | B1 * | 6/2001 | Minowa et al. ................ | 701/51 |
| 6,253,140 | B1 * | 6/2001 | Jain et al. ...................... | 701/67 |
| 6,318,182 | B1 * | 11/2001 | Boardman .................... | 73/714 |
| 6,381,529 | B1 * | 4/2002 | Mistry .......................... | 701/51 |
| 6,994,647 | B2 * | 2/2006 | Cicala et al. ................ | 475/121 |

OTHER PUBLICATIONS

Michael Barr's Embedded Systems Glossary, Article entitled "Introduction to Closed-Loop Control" by Michael Barr; Copyright 2002 by CMP Media, LLC.; http://www.netrino.com/Publicaitons/Glossary/PID.html.
Model-Based and System-Based Design; Simulink Reference Version 5; Copyright 2003, 2004 by The MathWorks, Inc.
Article entitled "Fixed-Point Blockset", User's Guide, For Use with Simulink; John E. Ciolfi; Copyright 1995-1997 by The MathWorks, Inc.
Article entitled "What is PID-Tutorial Overview"; http://www.expertune.com/tutor.html; Copyright 1999-2004 ExperTune, Inc.
Control Systems Engineering by William J. Palm III; pp. 316-368. Section 6.2 Control System Structure. Copyright 1986 by John Wiley & Sons, Inc.

* cited by examiner

*Primary Examiner*—Michael J. Zanelli

(57) ABSTRACT

A system for controlling pressure in a transmission comprises a transmission control unit, a valve controller that receives a desired pressure as input from the transmission control unit, a valve driver, a valve that regulates an amount of fluid in a transmission clutch, and a pressure transducer that reads a pressure in the transmission clutch and outputs a pressure reading to the valve controller, wherein the valve controller comprises logic for outputting to the valve driver an instruction for controlling the valve, the instruction being formulated using the desired pressure and the pressure reading.

9 Claims, 4 Drawing Sheets

CLOSED-LOOP, VALVE-BASED TRANSMISSION CONTROL ALGORITHM

This application is related to U.S. Pat. No. 6,807,472 entitled "CLOSED LOOP CONTROL OF SHIFTING CLUTCH ACTUATORS IN AN AUTOMATIC SPEED CHANGE TRANSMISSION," filed Dec. 23, 2003, and assigned to the assignee of the present invention.

FIELD OF THE INVENTION

This invention relates to closed-loop pressure control of a valve, such as a valve in a vehicle transmission.

BACKGROUND OF THE INVENTION

It is well known to use microprocessors for controlling valves in order to achieve a desired pressure of a hydraulic fluid in a clutch in an automatic transmission. Present systems utilize heuristic rules that assume that opening a valve for a certain period of time is proportional, i.e., bears a linear relationship to, a desired pressure in a transmission clutch. Thus, once this linear relationship is programmed into a logical controller, the system is forced to assume that causing a certain valve behavior is properly calibrated to the resulting pressure within the clutch. However, even if the calibration is initially accurate, over time it becomes less so due to the wear of parts in the transmission, degradation of transmission fluid, inherent nonlinearities in the system's behavior, etc. Moreover, present systems are inherently prone to error while in operation due to electrical load variations, pressure pulsations, and other system non-linearities.

In short, present transmission control systems are not able to re-calibrate, or apply corrections to, their pre-programmed heuristic rules while in operation. That is, present transmission control systems may be characterized as "open loop" in that they provide input to a transmission but fail to take advantage of information that could be provided from the transmission system as output. Accordingly, there is a need for a transmission pressure control system that accounts for the non-linearity that exists in practically every such system. It would be further desirable in such a system to eliminate or significantly reduce steady state error.

Further, as is known, vehicle performance, and in particular transmission performance, changes over time as vehicle parts, such as transmission parts, age and become worn. However, because they are open-loop, present transmission control systems are unable to calibrate the pressure applied in a clutch in a transmission to the present age and wear of the transmission. Present open loop systems simply are not capable of accounting for the wear and age of transmission parts.

Therefore, it would be advantageous to have a transmission control system in a vehicle that applied an amount of pressure on a transmission clutch that was appropriate for the age and wear of the transmission. Such a transmission control system would have the benefits of improved fuel economy and better "drivability", i.e., the transmission would shift more smoothly than it would with a conventional open loop control system. Further, such a transmission control system would have the benefit of enabling parts in a transmission to accumulate less wear as they age. Further, such a transmission control system would have the benefit of lowering the cost of parts in a transmission. This is because such parts would be required to have lower tolerances to fluctuations in pressure and other forces than today's transmission parts, thus lowering design and manufacturing costs.

Accordingly, there is a need for a transmission pressure control system that uses information about pressure states in the transmission to calibrate valve behavior with desired pressures.

SUMMARY OF THE INVENTION

A system for controlling pressure in a transmission comprises a transmission control unit, a valve controller that receives a desired pressure as input from the transmission control unit, a valve driver, a valve that regulates an amount of fluid in a transmission clutch, and a pressure transducer that reads a pressure in the transmission clutch and outputs a pressure reading to the valve controller, wherein the valve controller comprises logic for outputting to the valve driver an instruction for controlling the valve, the instruction being formulated using the desired pressure and the pressure reading.

Further, a method for controlling pressure in a transmission comprises receiving in a valve controller a desired pressure from a transmission control unit and outputting to a valve driver an instruction for controlling a valve in a transmission, the instruction being formulated using the desired pressure and a reading of an actual pressure in a transmission clutch.

DETAILED DESCRIPTION OF THE INVENTION

Figure 1:
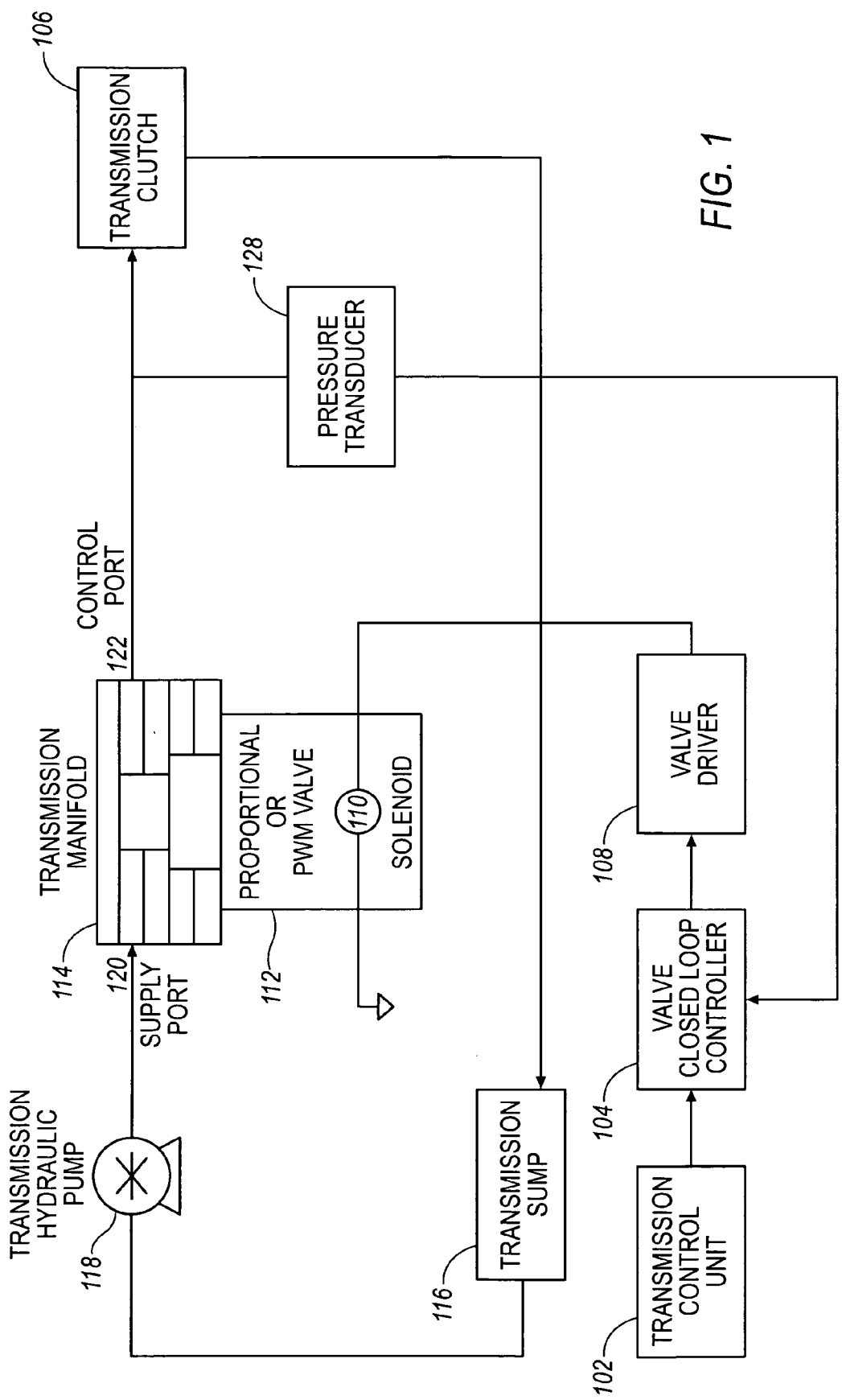
FIG. 1 provides a description of the inventive system.

With reference to FIG. 1, transmission control unit 102 outputs to valve controller 104 a desired pressure for a transmission clutch 106. Valve controller 104, using predetermined heuristic rules, instructs valve driver 108, an excitation driver capable of producing a desired voltage, to emit a certain voltage. The heuristic rules implemented in valve controller 104 comprise a variable gain control structure that is discussed in more detail below with reference to FIG. 2. In some embodiments, such as the one shown in FIG. 1, transmission control unit 102 and valve controller 104 each comprise at least one microprocessor. However, in other embodiments transmission control unit 102 and valve controller 104 are combined and together comprise one microprocessor. In general, transmission control unit 102 will be one such as is presently known in the art, while valve controller 104 presents several novel features, including but by no means limited to, the capability of receiving as input information relating to the pressure state of a transmission clutch, and applying heuristic rules to instruct valve driver 108 to produce a certain voltage based at least in part on the afore-mentioned information. Solenoid 110, which receives voltage from valve driver 108, is a component of valve 112, which in turn is disposed within transmission manifold 114.

Hydraulic fluid from transmission sump 116 is pumped via transmission pump 118 into transmission manifold 114 via supply port 120. Hydraulic fluid exits transmission manifold via control port 122. The state of valve 112 determines the quantity of hydraulic fluid that exits transmission manifold 114 in a given period of time from control port 122. Thus, the degree to which valve 112 is open or closed determines the quantity of hydraulic fluid that enters transmission clutch 126, i.e., the pressure that is applied to transmission clutch 126. For purposes of the discussion herein, valve 112 will be considered as "open" or "partially open" when all or some of the hydraulic fluid flowing through transmission manifold 114 is directed through control port 122. Similarly, valve 112 will be considered as "closed" or "partially closed" when none or some of the hydraulic fluid flowing through transmission manifold 114 is directed through control port 122.

Pressure transducer 128, which is a transducer such as will be known to those skilled in the art, is disposed proximate to or within transmission clutch 106. Pressure transducer 128 provides input to valve controller 104, which bases its instruction to valve driver 108 at least in part on a determination of the present pressure within transmission clutch 106. That is, valve controller 104 receives as input from transmission control unit 102 a desired pressure value, and receives from pressure transducer 128 a measured pressure value. The objective of the control logic implemented in valve controller 104, discussed in more detail below with reference to FIG. 2, is to determine what adjustments to make to valve 112 in order to cause the measured pressure in transmission clutch 106 to equal or more closely approximate the desired pressure determined by transmission control unit 102.

Valve 112 may be any kind of proportional valve, such as a Variable Bleed Solenoid (VBS) valve, or a Variable Force Solenoid (VFS) valve. Valve 112 may also be a Pulse Width Modulation (PWM) valve. VBS, VFS, and PWM valves are all well known in the art. VBS and VFS valves are also known as proportional valves because they regulate pressure based on the valve being open or partially open. A PWM valve, by contrast, operates on a duty cycle that comprises a percentage of time within a period of time during which the valve is open. By opening and closing during the duty cycle, the PWM valve emulates the steady state behavior of the VBS valve. As is known, PWM valves are more efficient to operate, but require greater bandwidth.

Figure 2:
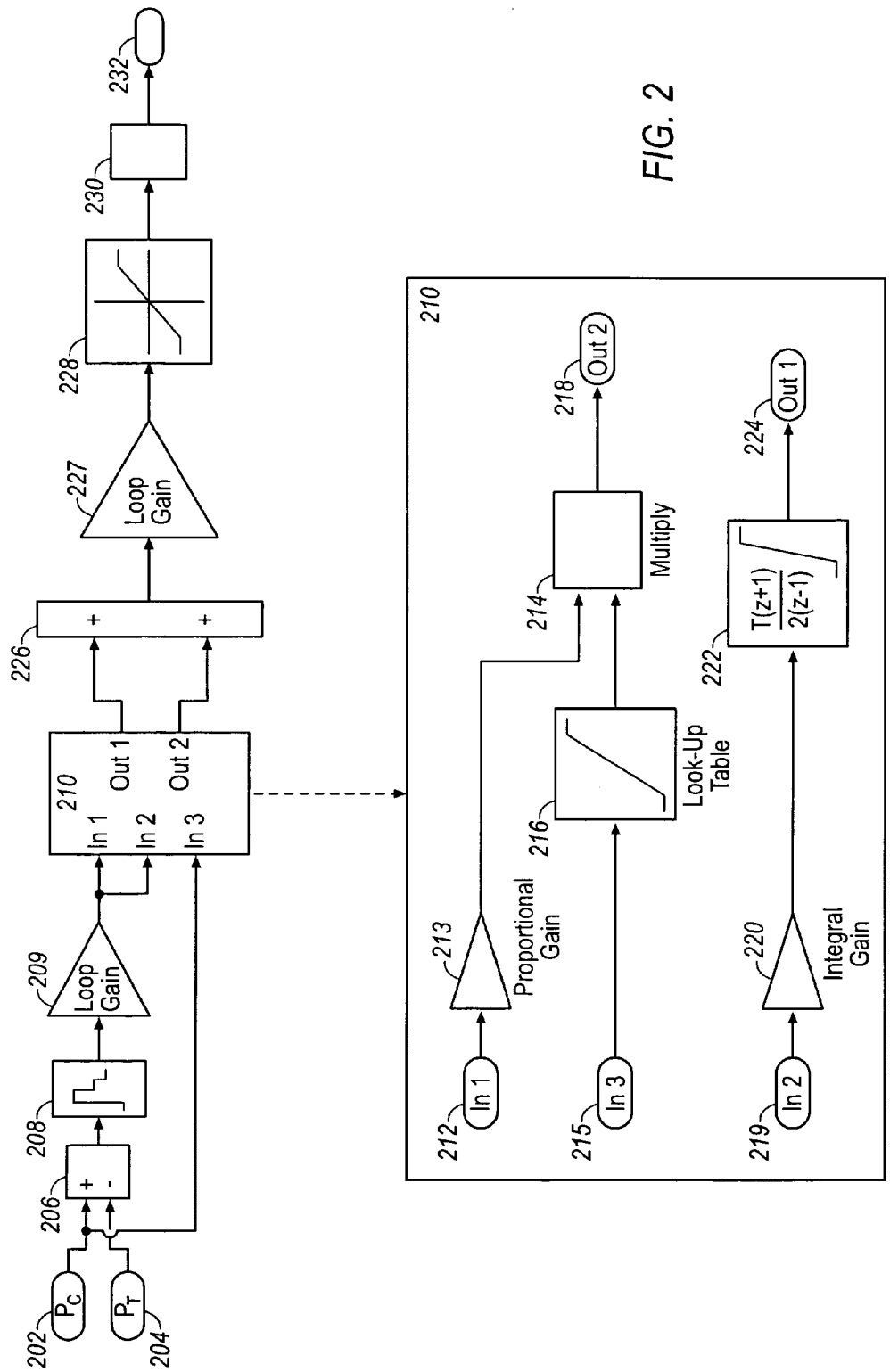
FIG. 2 provides a detailed view of the control logic of the inventive system.

FIG. 2 describes control logic that may be implemented in valve controller 104. In the embodiment depicted in FIG. 2, the control logic of valve controller 104 uses proportional-plus-integral control, also known as proportional-integral, or PI, control. Proportional-plus-integral control will be known to those skilled in the art. Other embodiments of the invention use proportional-integral-derivative (PID), proportional-derivative (PD), or feed-forward control, all of which are well known. Moreover, those skilled in the art will understand that the control logic described herein is one that has been empirically shown to be effective in reducing or practically eliminating steady state error, but that heuristic rules other than those described herein would be consistent with the spirit and scope of the present invention. In one practiced embodiment of the present invention, the SIMULINK® software program sold by The Mathworks, Inc., of Natick, Mass., has been used to model the heuristic rules.

Valve controller 104 receives as input two pressure values. $P_C$ 202 represents the desired pressure received from transmission controller 102, sometimes referred to as command pressure or control pressure. $P_T$ 204 represents a pressure reading from pressure transducer 128, that is, the actual pressure presently being exerted within transmission clutch 126. Block 206 calculates sampled error 208 by computing the difference between $P_C$ 202 and $P_T$ 204.

Loop gain 209 applies a simple gain to the input to variable gain block 210. Those skilled in the art will recognize increasing the magnitude of loop gain 209 will reduce error by enabling greater precision in the calculations of variable gain block 210. Of course, it will also be understood that once the magnitude of loop gain 209 is increased past a certain point, the system may become unstable.

Variable gain block 210 applies heuristic rules to produce an appropriate output from valve controller 104. Sampled error 208 is supplied as input 212 to proportional gain 213, which in turn provides input to multiplication block 214. $P_C$ 202 is supplied as input 215 to look-up table block 216, which uses a look-up table to determine the value of a constant by which sampled-error 214 should be multiplied. Use of this look-up table achieves gain scheduling to compensate for valve non-linearity. Those skilled in the art will recognize that the values in the lookup table can be empirically determined by noting what constant values corresponding to respective values of sampled error 208 result in the most accurate control of valve 112 with minimal response times. Block 214 multiplies sampled error 208 by the constant value determined in block 216 to produce output 218.

Sampled error 208 is supplied as input 219 to integral gain 220, which multiplies sampled error 208 by a constant that has been empirically determined to result in the most accurate control of valve 112 with minimal response times. Discrete time integrator 222 integrates values for sampled error 208 as modified by integral gain 220 in order to produce output 224. Discrete-time integration will be known to those skilled in the art. In general, discrete time integrator 222 is reset only when a vehicle is turned off and then on again. In one practiced embodiment, the present invention uses the Trapezoidal method of discrete-time integration implemented in the SIMULINK software program. The Trapezoidal method of discrete-time integration, among others, is described on pages 2–114 to 2–121 of the Simulink Reference (Version 5) by The Mathworks, Inc., incorporated herein by reference. Those skilled in the art will understand that other methods of discrete time integration could be used in discrete time integrator 222, including the Forward Euler and Backward Euler methods also described in the Simulink Reference.

Output 218 and output 224 are summed in block 226, the result of this summation being amplified by loop gain 227 and then provided to saturation block 228. It is well known that, unless a capacitor is given adequate time to discharge, it may become "saturated" with voltage, meaning that further input to the capacitor will not have the intended effect, and means for limiting the effect of such saturation are also well known. Accordingly, those skilled in the art will understand that saturation block 228 determines what delay 230 is required before input is provided to valve driver 208.

After delay 230, valve controller 104 provides input 232 to valve driver 108. In the case where valve 112 is a VBS valve, input 232 to valve driver 108 causes the valve 112 to be opened in the amount necessary to effect the desired pressure $P_C$ 202 in transmission clutch 126. In the case where valve 112 is a PWM valve, the input to valve driver 208 sets the duty cycle to a level appropriate to effect the desired pressure $P_C$ 202 in transmission clutch 126.

Figure 3:
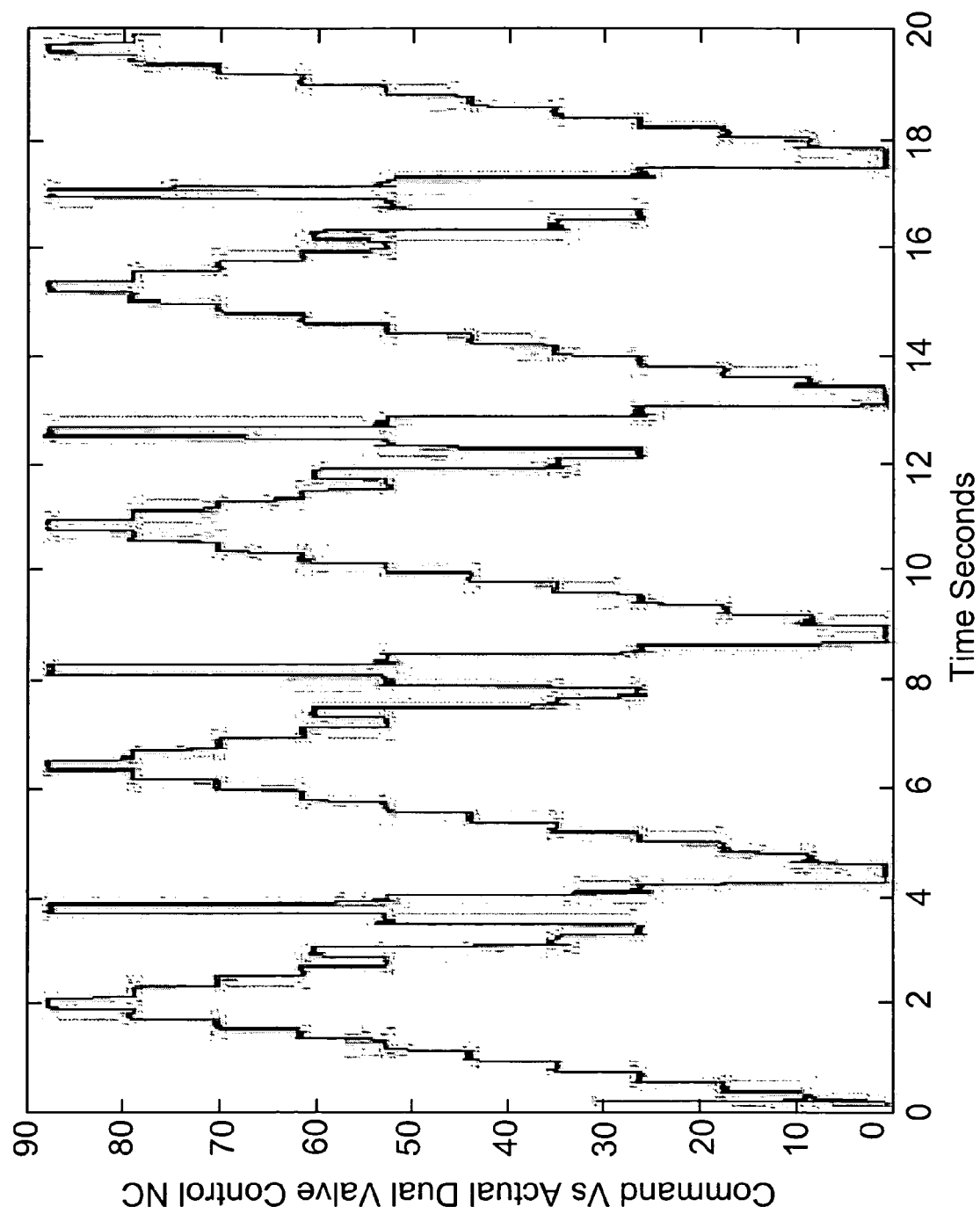
FIG. 3 is a first graph illustrating that the inventive system successfully produces a desired pressure in a transmission clutch.
Figure 4:
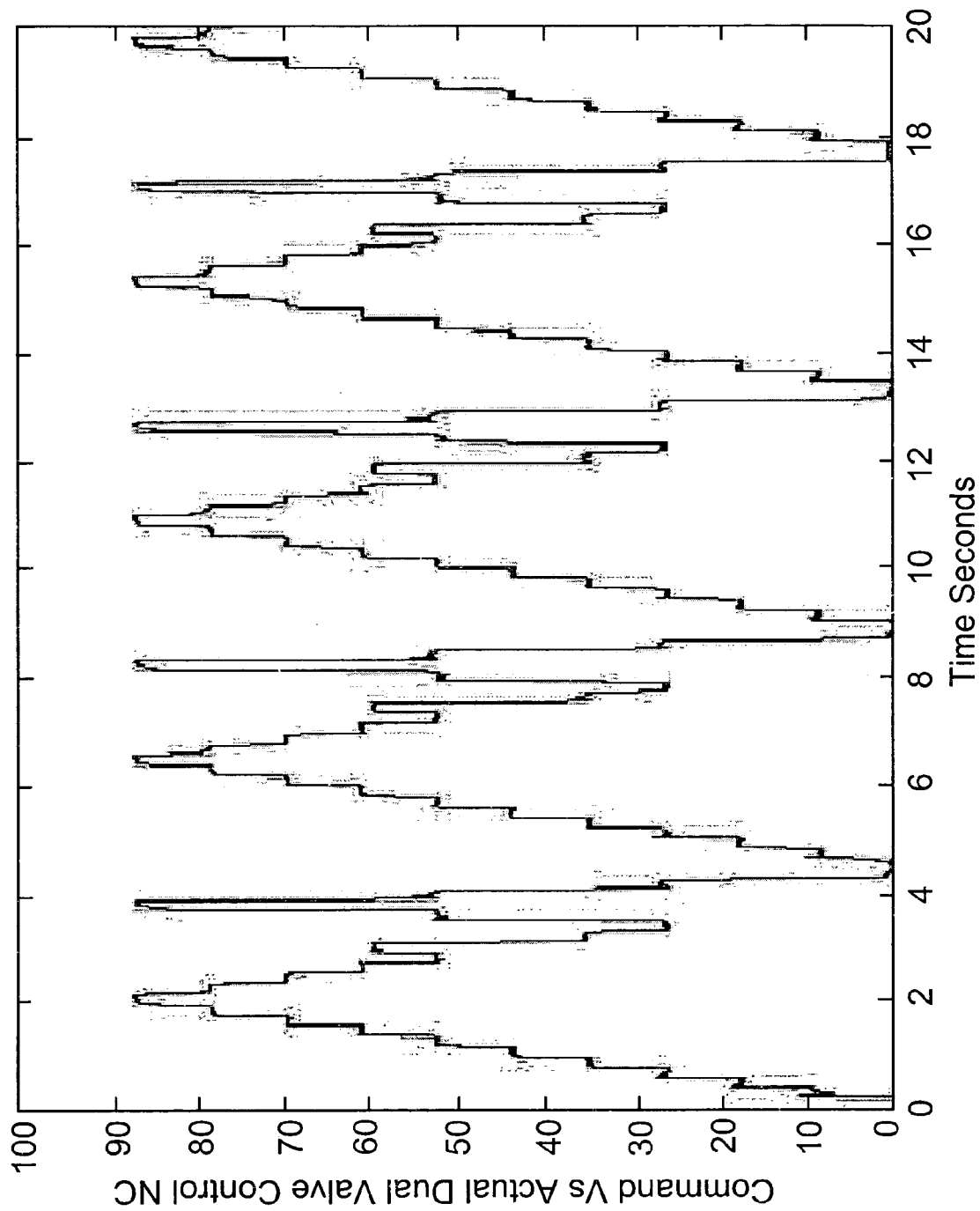
FIG. 4 is a second graph illustrating that the inventive system successfully produces a desired pressure in a transmission clutch.

FIGS. 3 and 4 are both graphs that illustrate that the inventive system very closely matches desired pressure $P_C$ 202 to the actual pressure $P_T$ 204 in transmission clutch 126. By achieving a close match between desired pressure $P_C$ 202 and actual pressure $P_T$ 204 in transmission clutch 126, the present invention achieves many valuable advantages over the prior art. Advantageously, the present invention provides for improved wear of transmission parts by causing desired pressure $P_C$ 202 to be appropriate for the age and wear of parts in a vehicle transmission. While prior art open loop transmission control systems can accurately match desired pressure $P_C$ 202 and actual pressure $P_T$ 204 to within ten pounds per square inch (PSI), the present invention has been shown to have an accuracy of up to plus-or-minus two pounds PSI. Thus, the present invention enables better fuel economy, longer and better wear of transmission parts, better drivability of a vehicle, i.e., a smoother shifting of gears than was previously possible, as well as lower design and manufacturing costs for transmission parts.

The above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the field of transmission control systems, and that systems and methods will be incorporated into such future embodiments. Accordingly, it will be understood that the invention is capable of modification and variation and is limited only by the following claims.

We claim:

1. A system for controlling pressure in a transmission, comprising:

a transmission control unit;

a valve controller that receives a desired pressure as input from the transmission control unit;

a valve driver;

a valve that regulates an amount of fluid in a transmission clutch;

and a pressure transducer that reads a pressure in the transmission clutch and outputs a pressure reading to the valve controller;

wherein the valve controller comprises logic for outputting to the valve driver an instruction for controlling the valve, the instruction being formulated using the desired pressure, the pressure reading, and one of proportional-plus-integral control, proportional-integral-derivative control feed-forward control, and proportional-derivative control.

2. The system of claim 1, wherein the valve is a pulse width modulation (PWM) valve.

3. The system of claim 1, wherein the valve controller comprises logic for determining whether the system has reached a saturation point.

4. The system of claim 3, wherein the saturation point comprises a maximum amount of a voltage that can be contained by a capacitor.

5. A method for controlling pressure in a transmission, comprising:

receiving in a valve controller a desired pressure from a transmission control unit; and outputting to a valve driver an instruction for controlling a valve in a transmission, the instruction being formulated using the desired pressure, a reading of an actual pressure in a transmission clutch, and one of proportional-plus-integral control, proportional-integral-derivative control, feed-forward control, and proportional-derivative control.

6. The method of claim 5, wherein the valve is a pulse width modulation (PWM) valve.

7. The method of claim 5, wherein the valve is a proportional valve.

8. The method of claim 5, wherein the valve controller comprises logic for determining whether the system has reached a saturation point.

9. The method of claim 8, wherein the saturation point comprises a maximum amount of a voltage that can be contained by a capacitor.

* * * * *